March 1, 1960     I. W. LICHTENFELS     2,926,759
HIGH SPEED BRAKING OF RAPID TRANSIT RAIL VEHICLES
Filed June 29, 1956
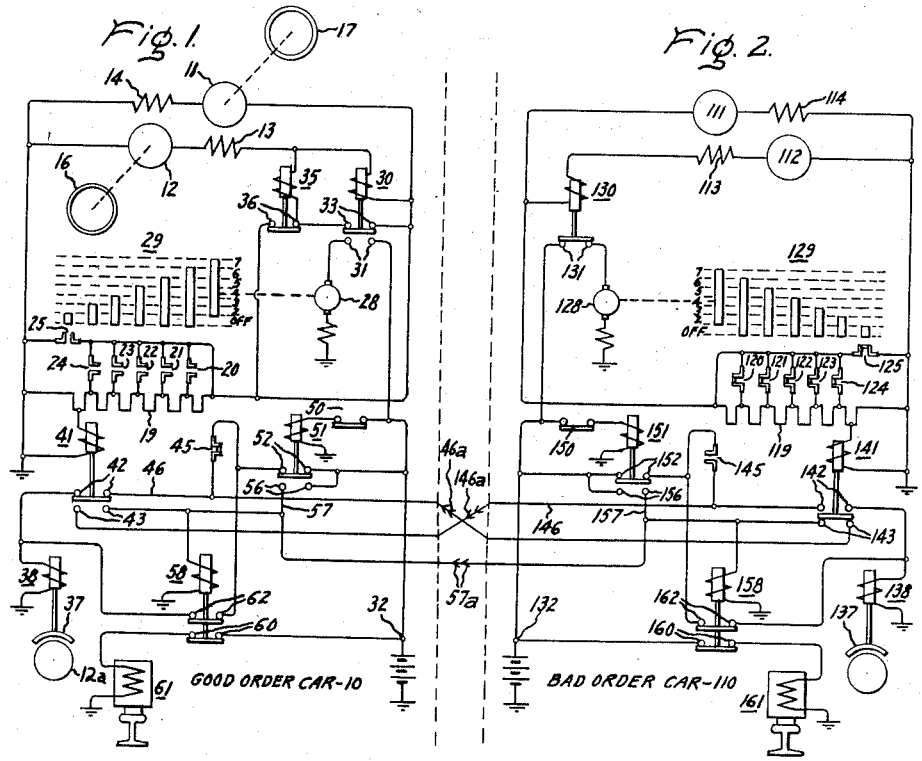
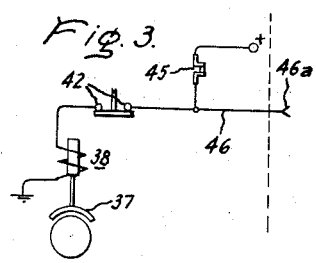
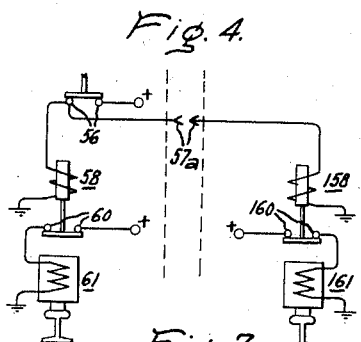
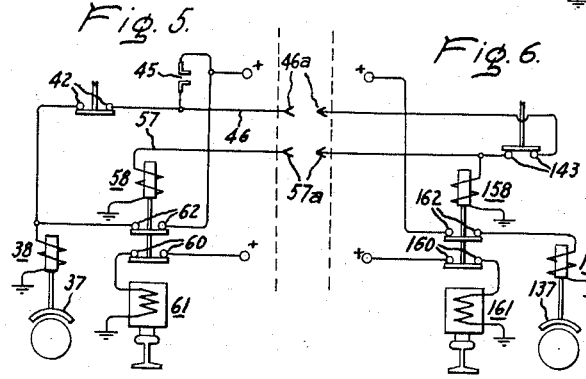
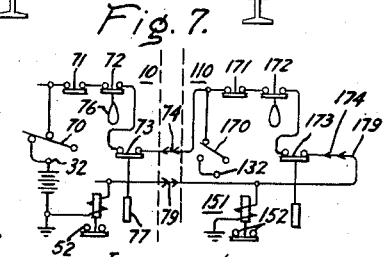
Inventor:
Ira W. Lichtenfels,
by David P. Ogden
His Attorney.

United States Patent Office 2,926,759
Patented Mar. 1, 1960

2,926,759

HIGH SPEED BRAKING OF RAPID TRANSIT RAIL VEHICLES

Ira W. Lichtenfels, Erie, Pa., assignor to General Electric Company, a corporation of New York Application June 29, 1956, Serial No. 594,881

6 Claims. (Cl. 188—159)

This invention relates to a brake control system for electric high speed rapid transit rail vehicles, and more particularly to the provision of a means for establishing locally complete braking including dynamic braking and auxiliary braking.

For many years, rapid transit trains have employed mechanical or air brakes as the primary means for stopping the train. These brakes operate by applying friction to rotating parts or to the rail over which the vehicle is traveling. As the maximum speeds of these vehicles is increased, the life of the friction brake is reduced considerably because of the fact that the friction at high speeds will create excessive heat between the sliding parts which will tend to soften the surfaces of the friction brake and may even reduce the effective friction therebetween. Therefore, as the speed increases, it is essential that a larger portion of the high speed braking effort be provided by dynamic (electric) braking depending on the motors driven as generators to develop a torque which will retard the vehicle. The energy or momentum of the train is converted to torque and this torque is dissipated in braking resistors. However, it may occur from time to time that the basic circuits of dynamic braking connections do not function in the usual manner and auxiliary friction brakes must be applied in the event of such failure. Also, at speeds less than two percent of the maximum motor speed, the generators will not provide sufficient torque to bring the train to a complete stop.

Therefore, an object of my invention is to provide an automatic braking control system.

A further object of my invention is to provide automatic application of friction brakes in event of insufficient dynamic braking.

In carrying out my invention in one form, a contactor controller is operated during dynamic braking to shunt resistance from a traction motor circuit until a desired braking current flows through the traction motors. A calibration relay, connected to sense the current in the motors, is then energized to open a contact and stop the controller. This operation of the calibration relay causes the controller to intermittently shunt resistor sections as the speed of the traction motors decreases. However, if the controller is not stopped, a dynamic brake failure is indicated, and the auxiliary brakes will be applied automatically to retard the train. Also, from the nature of dynamic braking, the braking torque descreases at low speeds after the entire resistor is shunted from the circuit. My invention automatically applies mechanical brakes to stop the train when the dynamic brake fades out.

The subject matter which I regard as my invention is particularly pointed out and distinctly claimed in the concluding portion of this specification. My invention, however, both as to its organization and method of operation, together with further objects and advantages thereof, may best be understood by reference to the following description, taken in connection with the accompanying drawing wherein similar parts have like reference numbers, in which:

Fig. 1 is a simplified circuit diagram of a rapid transit equipment having dynamic braking;

Fig. 2 is a similar circuit diagram of a rapid transit equipment having no dynamic braking;

Fig. 3 is a simplified circuit diagram of the interlocking components used during normal braking operation to apply mechanical braking when the dynamic braking is no longer effective;

Fig. 4 is a simplified circuit diagram showing the emergency interlocking connections;

Fig. 5 is a simplified circuit diagram showing the operation of a good order car operating with a bad order car;

Fig. 6 is a simplified circuit diagram showing the bad order car operating with a good order car; and Fig. 7 is a simplified circuit diagram showing interlocking emergency train line connections.

Referring to the drawing, I have shown in Fig. 1 the basic components of the control circuit employed in dynamic braking of a vehicle 10. The traction motors 11 and 12 and their respective field windings 13 and 14 provide a torque which controls the speed, direction of motion and the acceleration or deceleration of the vehicle 10. During dynamic braking these motors are driven as generators by the wheels 16 and 17 of the vehicle 10. In order to provide a balanced distribution of braking current, the field windings are connected to be energized separately instead of serially, thus the field winding 13 of the motor 11 is energized by the armature of the motor 12 and the field winding 14 is connected in circuit with the armature of the motor 11.

The power from the traction motors, when driven as generators during dynamic braking, is dissipated in a load resistor 19. In order to maintain a proper braking current of the traction motors, the load resistor 19 may be shunted from the circuit in a plurality of steps or notches "off," 2, 3, 4, 5, 6, 7, by selectively closing the contactors 20, 21, 22, 23, 24 or 25 in a predetermined sequence by the operation of a controller motor 28 which drives a cam controller 29 to close these contactors.

Although I have shown only six contactors for shunting the resistor 19 in seven notches, I contemplate that many more dynamic braking notches will be used in some applications. Particular arrangements for shunting dynamic braking load resistors from the circuit are a known art and their details are not a portion of this invention. One such arrangement is illustrated in Letters Patent 2,131,-588 issued to W. T. Gray on September 27, 1938, and assigned to the assignee of the present invention.

When it is desired to apply dynamic braking to slow the vehicle 10, the traction motors 11 and 12 are connected in the circuit shown (in Fig. 1) to dissipate their power across the load resistor 19. A calibration relay 30 is connected in circuit with the traction motor 12 to sense the traction motor current. Normally closed contacts 31 of the calibration relay 30 are connected between a power supply terminal 32 and the controller motor 28. When the current in the traction motor circuit increases to a predetermined value, the contacts 31 will be opened by the energization of the relay 30 to stop the controller motor 28 and prevent further shunting of the resistor 19.

In order that current in the motor circuit may be limited to a desired value despite the tendency of the field strength continuing to increase after initial stopping of the controller motor 20, the calibration relay 30 will be energized initially at a current that is substantially one-half of the desired dynamic braking current, and it is necessary to recalibrate it after its initial opening. One means of doing this is shown in Fig. 1 where normally open contacts 33 are closed by the energization of the relay 30.

The contacts 33 connect a coil of a relay 35 in the circuit to partially shunt the coil of the relay 30. If these coils have a similar impedance, the current from the traction motor 12 will now divide equally therebetween.

Holding contacts 36 of the relay 35 shunt the contacts 33 to maintain the relay 35 energized until the traction motor current drops below a predetermined minimum. One means of preventing undesired opening of the relay contacts 36 is to provide a time delay (not shown) on the opening of the relay 35 long enough for the controller motor 28 to be run through several steps. In this way, I am able to assure the following operation.

The traction motors are connected initially in the dynamic braking circuit with cross energization of the field windings to maintain balanced torque and current flow and with the relay contacts 31 in the normally closed position. The controller motor 28 runs through a portion of the steps driving the controller 29 to shunt sections of the resistor 19 and increase the current in the traction motors. At some predetermined value of current, substantially less than the value required to provide the maximum braking effort, the relay 30 is energized to open the contacts 31, stop the motor 28 and close the contacts 33 to energize the relay 35. Energization of the relay 35 closes the contacts 36 to shunt a portion of the motor current from the coil of the relay 30. Of course, the energization of the relay 35 and the closing of the contacts 33 may be delayed to prevent shunting of the dynamic braking current before the fields of the traction motors build up and the braking current reaches substantially the desired value.

Other means for accomplishing this recalibration of the calibration relay 30 are shown and described in detail in my copending application for Letters Patent, Serial Number 490,561, filed February 25, 1955, now Patent No. 2,844,780 and assigned to the assignee of the present application.

As the traction motor torque slows the train, the voltage generated by the motors, driven as generators, will be decreased proportional to the decrease in speed of the traction motors. This will reduce the current in the traction motors, de-energize the calibration relay 30 which will, in turn, energize the controller motor 28 to move the controller 29 to shunt another section of the resistor 19. The reduction of resistance increases the current in the traction motors, to again energize the calibration relay 30 to stop the controller motor 28.

Since dynamic braking requires at least some rotation of the traction motors, I prefer to provide a mechanical brake to bring the train to a complete stop. The particular type of mechanical brake is not important. Tread brakes which clasp the wheel to stop its rotation, or disk brakes which clutch a plate on the motor shaft will operate at slow speeds where dynamic braking is ineffective. In showing a drum brake 37, as one which will clasp the motor shaft 12a to inhibit the wheel rotation, I intend to cover all such mechanical brakes.

In order to prevent application of the mechanical drum brake 37 at high speeds, an interlocking means is energized to maintain the energization of a magnetic release coil 38 when dynamic braking is functioning properly. During dynamic braking, each section of the resistance 19 carries a current and has a voltage drop thereacross. There is a voltage drop across the last section to be shunted from the dynamic braking circuit. This voltage drop is sensed by a relay 41 until the contactor 25 is closed. As long as this relay 41 is energized, contacts 42 are shunted and contacts 43 are opened. Also, during the dynamic braking notches 2–7 of the drum controller 29, a contactor 45 is closed to energize a line 46 from the power supply terminal 32. The closing of the contacts 42 connects the line 46 to the magnetic release coil 38 and prevents the drum brake 37 from retarding the high speed rotation of the vehicle's wheels.

As the controller moves into the "off" notch of dynamic braking, the contactor 25 is shunted and the relay 41 will no longer remain energized to shunt the contacts 42. To insure de-energization of the magnetic release coil 38, the contactor 45 is also opened. I prefer that this occur at approximately 1 or 2 miles per hour which in the equipment using this invention is about 2 percent of the maximum traction motor speed. In the normal operation, the drum brakes are applied to stop the rotating equipment only at low speeds when the dynamic braking is fading. This operation uses the interlocking mechanisms shown in Fig. 3. It should be understood that the track brake 61 is not used in the normal operation.

From time to time it may be necessary to bring the train to a stop in a minimum of distance to avoid an accident. Under emergency conditions, a normally closed emergency switch 50 is opened to de-energize a relay 51 and open normally closed contacts 52. The opening of the contacts 52 disconnects the line 46 from the power supply terminal 32 to de-energize the magnetic release coil 38. It is apparent that the drum brake 37 is applied by the operation of the emergency switch 50.

De-energization of the emergency relay 51 also closes normally open contacts 56 to energize a line 57 and a relay 58. Normally open contacts 60 of the relay 58 will be closed to energize a track brake 61 to further retard the train. Normally open contacts 62 of the relay 58 and contactor 45 but are closed to bypass the contacts 42 and contactor 45 but serve no purpose under emergency operation because of the opening of the serially connected contacts 52. The line 57 is connected by a train line 57a running lengthwise of rail vehicles to other units to energize the track brakes and drum brakes thereof. It should be noted that by interlocking connections shown in Fig. 7, both the switch 50 and a normally closed emergency switch 150 (Fig. 2) are serially connected to deenergize simultaneously the relays 51 and 156.

Thus far, I have explained operation of my braking system with the dynamic braking functioning properly. However, under certain conditions the dynamic braking will not function properly and the controller 28 motor will continue to drive the controller 29 to shunt the resistor 19.

This operation is discussed in connection with Fig. 2 where the connections for establishing dynamic braking of an equipment 110 are similar to those used in the above discussion. A traction motor 111 is connected serially with a field winding 114 and a traction motor 112 is connected serially with a field winding 113. During dynamic braking these cross-energized traction motors are connected in circuit with a dynamic braking load resistor 119. The load resistor 119 has several sections which are shunted by similar contactors 120, 121, 122, 123, 124 and 125, of a controller 129, which is drivably connected to a controller motor 128. A calibration relay 130 has normally closed contacts 131 which, when closed connect the controller motor 128 to a power supply terminal 132.

However, in the equipment 110, the calibration relay 130 has not opened its contacts 131 and the controller motor 128 has driven the controller 129 through the entire braking cycle (notches 7 to "off").

Of course, it is desirable to prevent the operation of the traction motors 111 and 112 at high speed with the motor terminals shunted by the shunting of the resistor 119. Such protection would normally be accomplished by a circuit breaker which is not shown and the details of which do not affect materially this invention. A suitable protective arrangement is disclosed in my copending application for Letters Patent, Serial Number 594,882 filed June 29, 1956, and assigned to the assignee of the present application.

I prefer that the controller motors 28 and 128 run at a relatively high speed to complete each braking cycle notch in a relatively short time. Thus, with a circuit failure, the controller 129 is driven to the "off" notch in a few seconds. In the "off" notch of the braking cycle, a contact 145 is opened and the contact 125 is closed.

Closing the contact 125 shunts the last portion of the resistor 119 which de-energizes a relay 141 to open contacts 142 and close contacts 143. The opening of either of the contacts 142 or 145 disconnects the magnetic release coil 138 from the power terminal 132.

Normally this would apply a drum brake 137 in a manner similar to the low speed applications discussed above in connection with the vehicle 10. However, as shown in Figs. 5 and 6, with the two vehicles 10 and 110 being operated together, the train lines connections 46a and 146a, which are control lines running lengthwise of the multiple unit train, provide a different operation. The train line 46a is connected to apply power from the line 46 to one terminal of the contacts 143 during normal dynamic braking operation of the equipment 10. For the purposes of my invention, I shall refer to this relay as an interlocking means.

Closing the contacts 143 with the train line 46a energized causes energization of a relay 158 to close contacts 160 and apply power directly from the power supply terminal 132 to a track brake 161. This track brake 161 will be applied until the dynamic brake in the equipment 10 fades because of slowing of the vehicle enough to drive the controller 29 into the "off" notch to open the contact 45. At this time, power is removed from the train line 46a and from the relay 158.

Thus, I have shown a braking system which relies primarily on dynamic braking but will apply a track brake in each equipment when there is failure of dynamic braking in any equipment of a train.

In order to prevent operation of the drum brake 137 at high speeds, contacts 162 of the relay 158 are closed. Closing of the contacts 162 connects the magnetic release coil 138 of the drum brake 137 to the power supply terminal 132 through the normally closed emergency relay contacts 152. The interlocking circuit arrangement for this operation is shown in Fig. 6.

When one of the equipments (110) is operating without dynamic brakes as discussed above relative to Figs. 2 and 6, it affects the good order car (10) as discussed in Figs. 1 and 3 to energize the track brake 61. In Fig. 5, I have shown this operation. The closing of the contacts 143 (Fig. 6) energizes the train line 57a from the train line 46a to energize the relay 58 and close the contacts 60 and 62. Closing the contacts 60 energizes the track brake 61 to further retard the train. Closing the contacts 62 shunts the contacts 42 and the contactor 45. It may be seen from Fig. 5 that in order to de-energize the train lines 46a and 57a and the relays 58 and 158, when the good order car 10 is connected to a bad order car 110 both the contacts 42 and the contactor 45 must be opened. Since the line 46 is energized through both contactor 45 or the serially connected contacts 62 and 42, opening of only contactor 45 will not deenergize the line 46.

It is apparent from Figs. 5 and 6 that when equipments 10 and 110 are operating together, the failure of one dynamic braking arrangement will apply track brakes in both vehicles. If this should occur during service operation, the train may be run to the end of its immediate schedule at which time the bad order car should be repaired and the track brake inspected.

The failure of dynamic braking in both equipments or the application of emergency brakes in either equipment will apply drum brakes in both equipments by de-energizing both lines 46 and 146. Such a double failure is very unlikely, but if it should occur several times at high speeds, it is likely that the drum brakes should be replaced.

In Fig. 7, I have shown a simplified circuit diagram of an accepted emergency circuit adapted to protect two passenger car equipments in multiple operation. In order to allow release of the brakes when the engineman enters car 10 and is preparing to start the train, a deadman switch 70 is closed to apply power from the terminal 32 through a set of contacts 71 which are automatically closed by the closing of the passenger doors, through a normally closed emergency pullcord switch 72 a normally closed red block signal indicator switch 73 to a train line 74. When the doors are closed, contacts 71 close. Until an emergency pullcord 76 is pulled, switch 72 remains closed. The switch 73 remains closed until the train enters a red block having a dangerous track condition making it necessary to engage automatically a lever 77 which will function to stop the train quickly. In Fig. 1, the switches 70, 71, 72 and 73 are represented by the signal switch 50.

The emergency relay 51 is normally energized as shown. When the switches 71, 72 and 73 are closed and similar switches 171, 172 and 173 are closed in car 110 to energize train line 174 and the train line 179 which is connected electrically directly to train line 79. As shown in Fig. 7, the car 110, the end unit of the train, has the train lines 174 and 179 connected to complete the circuit and apply power to each of the emergency relays 51 and 151 to close the contacts 52 and 152 as shown in Figs. 1 and 2. With this series arrangement of each of the emergency type switches, it becomes readily apparent that any indication of an emergency will open both contacts 52 and 152. In car 110, a similar deadman switch 170 is shown in the open position. The switch 170 will be used at any time car 110 is used as a lead unit in a train. A more complete explanation of train lines and train line couplings may be found in Letters Patent of the United States 2,563,571 issued on August 7, 1951, to W. O. Woods and assigned to the assignee of the present application.

While I have shown and described particular modifications of my invention, further modifications and improvements thereof will occur to those skilled in the art. I desire it to be understood, therefore, that my invention is not limited to the particular form shown, and I intend, by the appended claims to cover all such modifications as do not depart from the true spirit and scope of the invention.

What I claim as new and desire to secure by Letters Patent of the United States is:

1. A dynamic braking control circuit for a plurality of rail vehicles connectable by train line controls comprising, a traction motor in each of the vehicles adapted to be driven as a generator during dynamic braking, a load resistor connectable in series with each of said motors to limit the current therethrough during dynamic braking, means in each of the vehicles for selectively and progressively shunting sections of said resistors, a current sensing means in each of the vehicles connected in circuit with each of said traction motors for stopping said shunting means at a predetermined value of braking current, a track brake in one of said vehicles, switching means in said one of said vehicles for actuating said track brake, and means responsive to a failure of either of said current sensing means for energizing said switching means.

2. A dynamic braking control circuit for a plurality of rail vehicles connectable by train line controls comprising, a traction motor in each of the vehicles adapted to be driven as a generator during dynamic braking, a load resistor connectable in series with each of said motors to limit the current therethrough during dynamic braking, means in each of the vehicles for selectively and progressively shunting sections of said resistors, a current sensing means in each of said vehicles connected in circuit with said resistors, a track brake in one of said vehicles, a switching means in said one of said vehicles for actuating said track brake, said switching means being energized upon failure of the dynamic braking circuit to energize a current sensing means in either of said vehicles.

3. A dynamic braking control network for a pair of rail vehicles connectable by train lines comprising, a first traction motor in a first of said vehicles, a second traction motor in the second of said vehicles, said traction motors being drivable as generators during dynamic braking, a first and a second current limiting resistor connectable in circuit with each of said motors respectively, means in each vehicle for selectively shunting portions of said resistors, track brakes in each of said vehicles, a first switch means in each vehicle for sensing the shunting of a last portion of each of said resistors, a second switch means in each vehicle for applying said track brakes, said second switching means being energized by the actuation of either of said first switch means.

4. A dynamic braking control network for a pair of rail vehicles connectable by train lines comprising, a first traction motor in a first of said vehicles, a second traction motor in a second of said vehicles, said traction motors being drivable as generators during dynamic braking, a first and a second current limiting resistor connectable in circuit with each of said motors respectively, means in each vehicle for selectively shunting portions of said resistors, a drum brake in each vehicle, a first switch means in each vehicle for sensing the shunting of a last portion of each of said resistors, a second switch means in each vehicle for preventing the application of said drum brakes, said second switch means being energized by the actuation of either of said first switch means.

5. A dynamic braking control network for a pair of rail vehicles connectable by train lines comprising, a first traction motor in a first of said vehicles, a second traction motor in the second of said vehicles, said traction motors being drivable as generators during dynamic braking, a first and a second current limiting resistor connectable in circuit with each of said motors respectively, means in each vehicle for selectively shunting portions of said resistors, track brakes in each of said vehicles, a first switch means in each vehicle for sensing the shunting of a last portion of each of said resistors, a second switch means in each vehicle for applying said track brakes, said second switch means being prevented from applying said track brakes when both of said first switch means are actuated.

6. A dynamic braking control network for a pair of rail vehicles connectable by train lines comprising, a first traction motor in a first of said vehicles, a second traction motor in the second of said vehicles, said traction motors being drivable as generators during dynamic braking, a first and a second current limiting resistor connectable in circuit with each of said motors respectively, means in each vehicle for selectively shunting portions of said resistors, drum brakes in each of said vehicles, a first switch means in each vehicle for sensing the shunting of a last portion of each of said resistors, said first switch means being arranged to actuate said drum brake upon shunting of said last portion, second switch means in each vehicle for preventing application of said drum brakes, said second switch means being inoperative to prevent application of said drum brakes when said first switch means in each vehicle actuates said drum brakes.

References Cited in the file of this patent

UNITED STATES PATENTS

| | | |
|---|---|---|
| 2,066,920 | Willby et al. | Jan. 5, 1937 |
| 2,243,068 | Blue et al. | May 27, 1941 |
| 2,246,127 | Davis | June 17, 1941 |
| 2,656,222 | Hines | Oct. 20, 1953 |
| 2,656,501 | Cotter | Oct. 20, 1953 |